Dec. 26, 1967   P. W. TRUMBO ET AL   3,360,249
DISCHARGE GRATE AND HOPPER FOR SHAFT KILN
Filed April 7, 1965   2 Sheets-Sheet 1

INVENTORS
PHILLIP W. TRUMBO
JOHN H. CARPENTER
THOMAS A. HENDRICKSON
BY
Ralph F. Crandell
ATTORNEY INVENTORS
PHILLIP W. TRUMBO
JOHN H. CARPENTER
THOMAS A. HENDRICKSON
BY
Ralph F. Crandell
ATTORNEY United States Patent Office 3,360,249
Patented Dec. 26, 1967

3,360,249
DISCHARGE GRATE AND HOPPER FOR SHAFT KILN
Phillip W. Trumbo, Montrose, John H. Carpenter, Englewood, and Thomas A. Hendrickson, Golden, Colo., assignors to Cameron and Jones, Incorporated, Denver, Colo., a corporation of Colorado
Filed Apr. 7, 1965, Ser. No. 446,340
2 Claims. (Cl. 263—29)

ABSTRACT OF THE DISCLOSURE

A circular shaft kiln includes a discharge grate at its lower end and concentric discharge hoppers which collect treated material according to the radial position of such material in the kiln.

Background of the invention

The present invention relates to continuous gravity flow kilns and furnaces and to discharge hoppers therefor. More particularly, the present invention relates to a discharge hopper construction finding particular, but not necessarily exclusive, use with a circular shaft kiln and improved discharge grate of the character described in U.S. Patent 3,027,147, issued Mar. 27, 1962, to Lewis H. Brakel and John B. Jones, Jr.

Shaft kilns of the type disclosed in the above-mentioned patent are adapted to accommodate a downward flow of discrete solid materials and to expose such solids to an upward flow of fluids, notably gases. Such fluids permeate the bed of solids and react with or otherwise treat these materials for various end purposes. The efficacy of the treatment or reaction is determined in large measure by the ability to afford a uniform, regulated movement of solids through the kiln, at all zones transverse of the bed of solids, and also by the ability to regulate and establish a uniform movement of fluids upwardly through the charge of solids. While shaft kilns which are circular in transverse cross-section have been found to be particularly efficient and economical, it has been observed that the treatment of a portion of the solid bed immediately adjacent the kiln wall proceeds at a somewhat lesser rate than the corresponding treatment of the bed interiorly of the kiln. Various explanations have been offered for this phenomenon, including the fact that a greater void area is formed adjacent the walls where the material particles in the bed contact the walls.

Objects and summary of the invention

Accordingly, it is the principal object of the present invention to segregate from the final product of the kiln that relatively small portion of discrete solid particles from the area of the bed immediately adjacent the kiln walls. A related object is to provide a discharge hopper construction for a vertical shaft kiln adapted to segregate and separately discharge that portion of the discrete solid material bed passing through the kiln immediately adjacent the kiln walls.

Another object of the present invention is to increase the uniformity of product produced in a shaft kiln and thereby improve the efficiency of and promote the uniformity of operation of the kiln.

A further object of the present invention is to increase the utility of a shaft kiln for various types of selective treatment and reaction processes, and to facilitate the selective collection of solid materials treated or reacted in the kiln.

In summary, the present invention involves the combination of a circular shaft kiln, a discharge grate mechanism at the lower end of the kiln having a plurality of concentric annular retarder plates superimposed by a plurality of deflectors, generally triangular in cross-section, positioned over the openings defined by the retarder plates, eccentric orbitally moving scraper rings for pushing collected material over the edges of the retarder plates, and concentric discharge hoppers having upper rim portions extending through the openings defined by the retarder plates for selectively collecting materials discharged therefrom.

Description of the preferred embodiment

Figure 1:
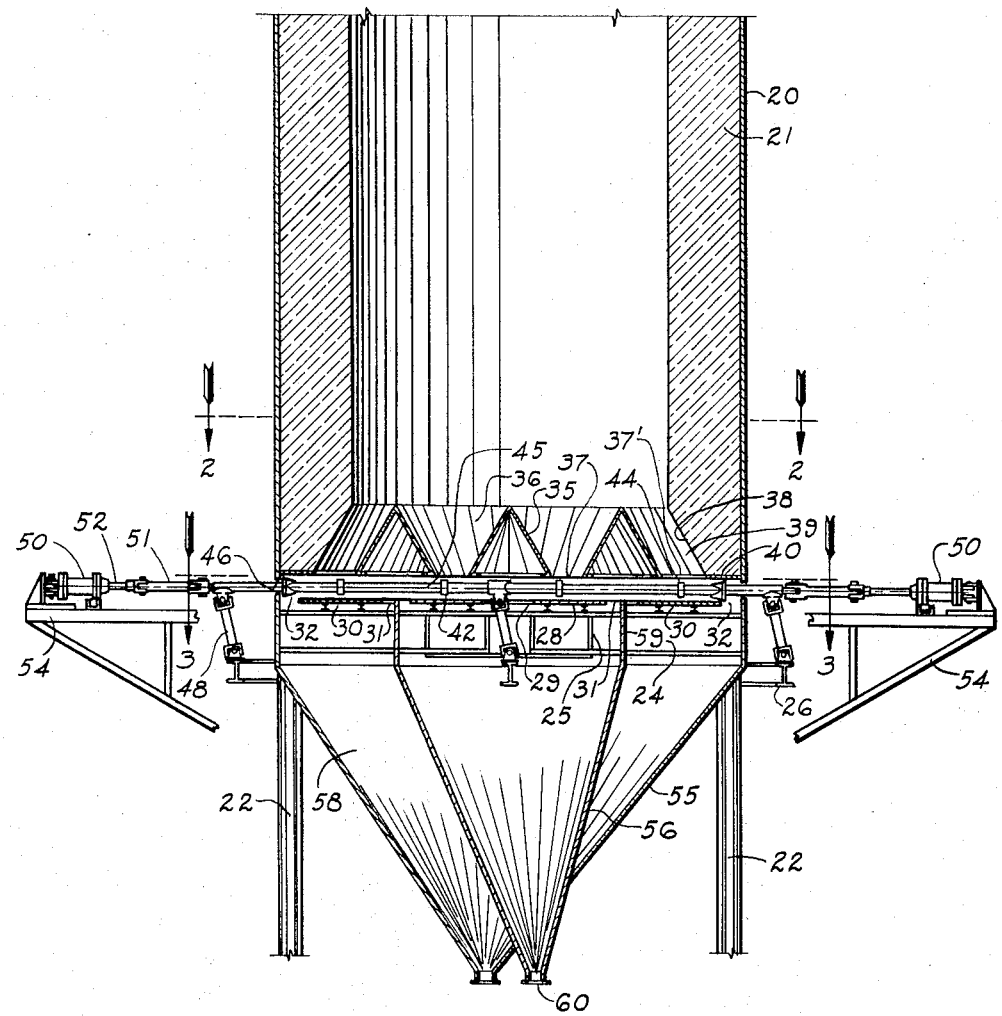
FIG. 1 is a somewhat diagrammatic vertical section taken axially through a shaft kiln embodying the present invention.
Figure 2:
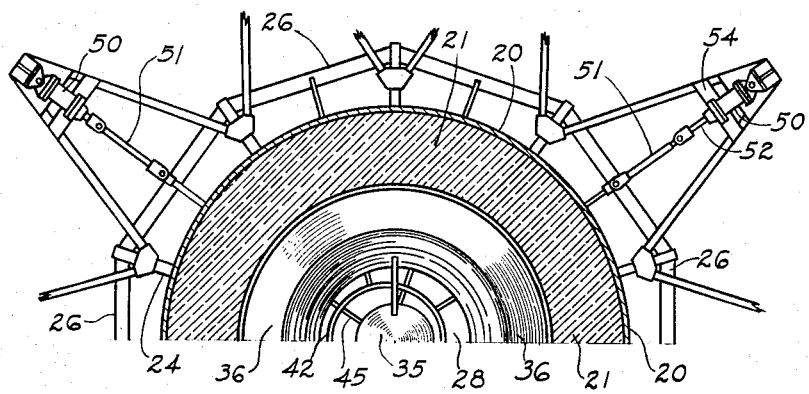
FIG. 2 is a section view through a shaft kiln embodying this invention, taken substantially in the plane of line 2—2 on FIG. 1.
Figure 3:
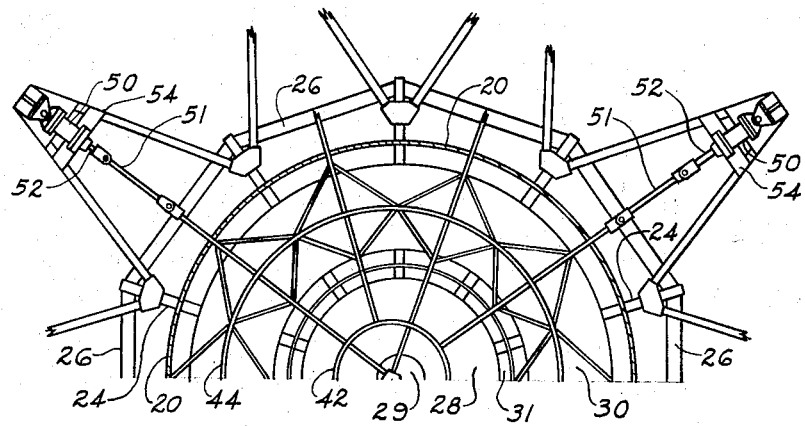
FIG. 3 is a horizontal section through a shaft kiln embodying the present invention, taken substantially in the plane of line 3—3 on FIG. 1.

A shaft kiln, having a discharge hopper organization embodying the present invention, is illustratively depicted in FIGS. 1 through 3 of the drawings. The shaft kiln and discharge grate mechanism as shown herein are substantially the same as shown and described in detail in U.S. Patent 3,027,147, and reference should be made to that patent for a more detailed description of the shaft and grate organization. For purposes of establishing location and orientation of the present invention with respect to a shaft kiln and grate mechanism, however, a brief description of the patented shaft, kiln and grate organization will be given herein.

Referring to FIG. 1, the shaft kiln is typified by an axially extending vertical tubular shell 20 of appropriate rigid material, such as steel, and of any expedient construction. Contained within this shell is a lining 21 of appropriate refractory or other suitable lining material, the composition of which will depend substantially on the material to be treated. The shaft kiln shell 20 and lining 21 therein is fixedly supported in a desired position of use on a rigid skeleton frame comprised of vertical columns 22, inwardly convergent radial beams 24 closing to a central ring beam 25, and chordally disposed outboard beams 26 integrated with the columns 22 and radial beams 24. The shell 20 and lining 21 is conventionally arranged at its upper end with appropriate inlet chutes and distributor (not shown) to receive a continuous delivery of solid materials for treatment in the kiln, and also with fluid exhaust ports (not shown) to vent fluids such as gases rising upwardly through the kiln. At the lower end of the lining 21, the kiln is provided with a discharge grate and hopper organization embodying the present invention.

The discharge grate and hopper organization embodying the present invention comprises a plurality of flat, rigid, annular retarder plates, fixedly supported, as by the radial frame beams 24, in relatively spaced, coplanar relation, concentric within and transversely of the lower end of the shell 20 and lining 21 to close across and obstruct the major area thereof. In the arrangement shown in the drawings, there is provided an inner retarder plate 28, the larger diameter of which is substantially less than the radius of the associated lining 21, and having an inner diameter defining a central opening 29 of a diameter on the order of one-seventh of that of the plate outer circumference. This inner retarder plate 28 is fixed concentrically within and transversely of the shell and lining, and with the central opening thereof concentric with the axis of the kiln. Surrounding the inner retarder plate and spaced therefrom are one or more outer retarder plates 30, these outer retarder plates being annular in shape and being disposed concentrically and coplaner with the inner retarder plate 28 and with each other. For purposes of simplifying this description, only one such outer annular retarder plate is shown in the drawings. Those skilled in the art will readily appreciate the construction and location of other such plates. The outer plate as shown is sized and positioned to define an annular interval or opening 31 with the circumscribed retarder plate 28, as well as to define, with the interior wall of the shell 20, an outer annular opening 32.

The fixed structure of the discharge grate is completed by means of an array of deflectors 35, 36 rigidly disposed to register with and to close over the interruptions or openings 29, 31 defined by, through and between the retarder plates 28, 30, in overhanging, spacedly superjacent relation therewith. As shown in the drawing, the illustrative deflectors comprise a central conical shaped deflector 35 positioned over the central opening 29 in the inner retarder plate 28. Surrounding the conical deflector 36, which is generally isosceles-triangular shaped in radial cross-section, and which is positioned over the annular opening 31 defined between the inner retarder plate 28 and the outer retarder plate 30. While not shown, if additional retarder plates defining additional annular openings are utilized, additional annular deflectors similar to that deflector 36 herein described will be utilized. The lower edges of the deflectors 35, 36 define concentric throats 37, 37' corresponding to and spaced above the subjacent retarder plates 28, 30.

In order to direct material contained within the kiln and positioned adjacent the walls thereof in a generally outwardly sloping direction along the outer surface of outer deflector 36, the lower end of the lining 21 defines an outwardly sloping internal annular skirt or surface 38 which, in configuration is substantially parallel to the outer surface of the deflector 36. It will be appreciated that, depending upon the radial space between the apex of the outer deflector 36 and the adjacent wall of the lining 21, a portion of the solid bed contained within the kiln lining will thereby be deflected downwardly and outwardly through the channel 39 as defined between the outer annular deflector 36 and the lining wall 38, onto the outer retarder plate 30. Registering with and closing over the outer opening 32 between the outer retarder plate 30 and the shell 20 is an inwardly directed annular flange 40, fixed to or integral with the shell 20 and defining a lower end support for the lining 21.

It will be appreciated that as the bed of solid material moves downwardly through the kiln, its movement is interrupted and retarded by the retarder plates 28, 30. In order to remove solid material from the retarder plates in a uniformly and continuous flow through the annular throats at opposite edges of each retarder plate, there is provided as a part of the grate mechanism a movable discharge scraper, an illustrative scraper mechanism being described in the above-identified patent. Briefly, the discharge scraper embodies a plurality of concentric scraper rings 42, 44, the inner ring 42 of which is positioned in juxtaposed relationship with the inner retarder plate 28 and the outer ring 44 of which is positioned in juxtaposed relation over the outer retarder plate 30. It will be appreciated, of course, that additional rings will be provided corresponding to the number of retarder plates utilized. The rings 42, 44 are supported on radially extending arms 45 extending outwardly through appropriate openings 46 in the shell 20 and supported on oscillatable rigid links 48, which are in turn mounted for swinging movement on the outer beams 26. The links 48 are sized and arranged to support the rings 42, 44 and arms 45 for free floating actuation in the space between the plane of retarder plates 28, 30, and common to the bases of the deflector elements 35, 36, within a limited range relative to and out of contact with any of the elements of the fixed structure. It is the function of the rings 42, 44 to push collected solid materials from and over the opposite free edges of the retarder plates 28, 30 as the rings are shifted away from concentric relation with the plates. To provide this shifting movement, appropriate power instrumentalities such as hydraulic rams or motors 50 are provided at circumferentially spaced intervals around the kiln. These motors 50 are hingedly linked to the arms 45 by links 51 connected to the piston 52 of each motor 50. The motors are supported on appropriate brackets 54 attached to the frame supporting the shell 20. With a hydraulic motor 50 linked to each of the arms 45 of the movable ring structure, it is feasible, by powering said units from any source of fluid pressure, to orbitally shift the rings relative to the median circles of the associated retarder plates, and with the accumulation of solids imposed upon the plates, to urge such solids progressively, uniformly and gradually to discharge over first one and then the other of the retarder plate free margins as the rings move with the associated structure through eccentric correlations with the retarder plates and the circular throats.

As the solids are discharged over the marginal edges of the retarder plates 28, 30, they are collected by appropriate discharge hoppers 55, 56 forming a part of the present invention. As shown in FIG. 1, the accumulated solids collected on the outer retarder plate 30 fall over the marginal edges thereof and are collected in an outer hopper 55 converging downwardly and inwardly from the shell 20 and defining, with an inner hopper 56, an annular collection area indicated generally at 58. The inner hopper 56 is constructed with an upper wall inwardly spaced from and concentric with the shell 20. This wall 59 terminates intermediate the co-adjacent edges of the retarder plates 28, 30 and defines a baffle for directing solid materials discharged from the respective edges of each of the plates into the appropriate hoppers. At its lower end, the cylindrical wall 59 terminates in a downwardly and inwardly converging hopper 56 leading to a discharge opening 60. As solid materials are discharged from the inner retarder plate 28, these inner materials are carried into the hopper 56 and thence out through opening 60. It will be appreciated that materials flowing downwardly through the kiln adjacent to the walls of the liner 21 are discharged through the outer hopper 55 whereas the innermost materials passing inside of the deflector plate 36 and around the deflector cone 35 are collected in the inner hopper 56. The hopper construction of this invention thus constitutes selective discharge hoppers by means of which, together with the grate mechanism, selectively treated materials may be appropriately segregated.

If desired, these separate discharge hoppers may be utilized as inlet ducts for treating fluids. By appropriately controlling the treating fluids, various transverse areas throughout the bed may be given somewhat different treatments, thereby further enhancing the utility of the kiln.

Material discharged over the retarder plate margins and into the respective hoppers thence flows to conveyors or analogous conveying means for subsequent handling or treatment. The material discharged in the outer hopper may be recirculated to the top of the kiln or may be segregated for further treatment in a different unit. Those skilled in the art will appreciate that the combination of the discharge grate mechanism and the hopper discharge organizations substantially facilitates and promotes the efficiency and efficacy of use of the shaft kiln.

While a certain preferred embodiment of the invention has been shown in the drawings and described above in considerable detail, it should be understood that there is no intention to limit the invention to specific form disclosed. On the contrary, the intention is to cover all modifications, alternative constructions, equivalents and uses of the present invention as may fall within the scope of the appended claims.

We claim as our invention:

1. A shaft kiln comprising, in combination, a vertical tubular shell adapted to confine a charge of particulate solid material for continuous gravity flow therethrough, a fixed discharge structure at the lower end of said shell comprising concentric deflectors having downwardly and outwardly sloping walls and defining coplanar spaced concentric annular throats, complementary concentric annular retarder plates corresponding to said throats and defining coplanar spaced concentric openings spaced subjacent and radially offset relative to said throats, said deflectors and plates transversely obstructing a lower portion of said shell to inhibit flow of material directly therethrough, a unitary movable structure characterized by concentric rings overlying said retarder plates and respectively registerable with said throats and shiftable transversely of the shell within the zone of the fixed structure separating said deflectors and plates, means for oscillating said movable structure to impel the movable structure orbitally and eccentrically of said shell to correspondingly traverse said ring components across said plates to discharge particulate solid material therefrom through said openings, at least two concentric discharge hoppers adapted to receive the discrete solids material discharged from said plates selectively from radially adjacent portions of the shell, the outermost hopper having an upper rim portion secured to said tubular shell, and the inner of said hoppers having a rim extending upwardly through an opening defined between two of said annular retarder plates, whereby particulate solid material treated in the zone of the kiln adjacent the wall thereof is collected in the outermost hopper and thereby separated from the balance of material from said kiln.

2. In a shaft kiln, the combination comprising, a tubular shell adapted to confine a charge of particulate solid material for continuous gravity flow therethrough, a grate structure including deflectors defining spaced concentric annular throats and subjacent retarder plates defining spaced concentric openings spaced subjacent and radially offset relative to said throats, said deflectors and plates transversely obstructing a lower portion of said shell to inhibit flow of material directly therethrough, means for continuously discharging solids material collected by said fixed structure through said spaced, concentric openings, and at least two concentric discharge hopper means for selectively collecting materials discharged through respective ones of said openings, the outermost hopper having an upper rim portion secured to said tubular shell, and the inner of said hoppers having a rim extending upwardly through an opening defined between two of said retarder plates, whereby particulate solid material treated in the zone of the kiln adjacent the wall thereof is collected in the outermost hopper and thereby separated from the balance of material from said kiln.

References Cited
UNITED STATES PATENTS

| | | | |
|---|---|---|---|
| 555,593 | 3/1896 | Welch | 209—375 X |
| 3,027,147 | 3/1962 | Brakel et al. | 263—29 |
| 3,064,960 | 11/1962 | Beckenbach | 263—29 |
| 3,077,266 | 2/1963 | Plumb | 209—259 X |

FREDERICK L. MATTESON, JR., *Primary Examiner.*

JOHN J. CAMBY, *Examiner.*